(12) United States Patent
Griffin

(10) Patent No.: US 10,024,011 B2
(45) Date of Patent: Jul. 17, 2018

(54) ANIMAL WASTE COLLECTING TOOL

(71) Applicant: Jennifer Barber Griffin, Lighthouse Point, FL (US)

(72) Inventor: Jennifer Barber Griffin, Lighthouse Point, FL (US)

( * ) Notice: Subject to any disclaimer, the term of this patent is extended or adjusted under 35 U.S.C. 154(b) by 0 days.

(21) Appl. No.: 15/691,377

(22) Filed: Aug. 30, 2017

(65) Prior Publication Data
US 2018/0058024 A1    Mar. 1, 2018

Related U.S. Application Data

(60) Provisional application No. 62/381,166, filed on Aug. 30, 2016.

(51) Int. Cl.
*E01H 1/12*    (2006.01)

(52) U.S. Cl.
CPC ..... *E01H 1/1206* (2013.01); *E01H 2001/128* (2013.01); *E01H 2001/1293* (2013.01)

(58) Field of Classification Search
CPC .......... A01K 23/005; A01K 1/01; B25G 1/04; B25G 1/102; B25G 3/26; E01H 1/1206; E01H 2001/1293; E01H 2001/128
USPC ........................................................ 294/1.4
See application file for complete search history.

(56) References Cited

U.S. PATENT DOCUMENTS

| | | | | |
|---|---|---|---|---|
| 8,511,728 B2* | 8/2013 | Beaton | ................. | A01K 23/005 294/1.4 |
| 8,684,429 B1* | 4/2014 | Holub | .................. | E01H 1/1206 294/1.4 |
| 2007/0176444 A1* | 8/2007 | Pilas | ..................... | A01K 23/005 294/1.5 |
| 2009/0045639 A1* | 2/2009 | Shalhoub | ............. | A01K 23/005 294/1.5 |
| 2011/0057463 A1* | 3/2011 | Chen | ..................... | A01K 23/005 294/1.4 |

* cited by examiner

*Primary Examiner* — Stephen A Vu
(74) *Attorney, Agent, or Firm* — The Van Winkle Law Firm; William G. Heedy; David M. Carter

(57) ABSTRACT

An animal waste collecting tool for improved sanitization includes an elongated shaft having an upper end and a lower end. The upper end connects to an attachment member that is for securing the tool with a user's arm. The lower end connects to a V-shaped support member wherein two legs of the V-shaped support member are connected to a semi-circular member. On the bottom surface of the semi-circular member, there are a plurality of hooks on the bottom surface of the semi-circular member, each of the plurality of hooks being biased in the forward direction. Another hook being biased in the rearward direction is inside the tip between two legs of the V-shaped support member, for securing a disposable bag on the semi-circular member in conjunction with the plurality of hooks on the bottom surface of the semi-circular member.

8 Claims, 8 Drawing Sheets

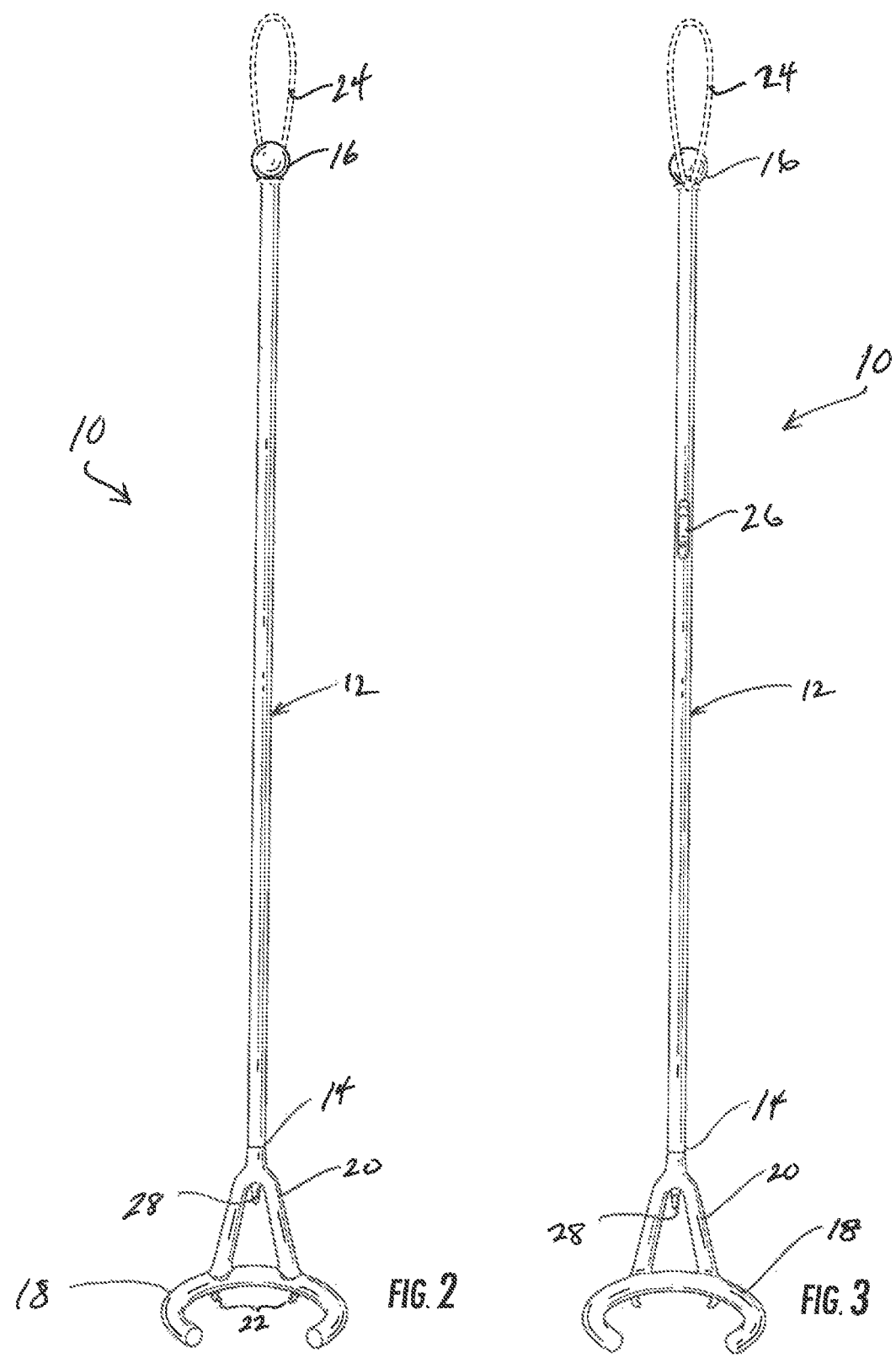

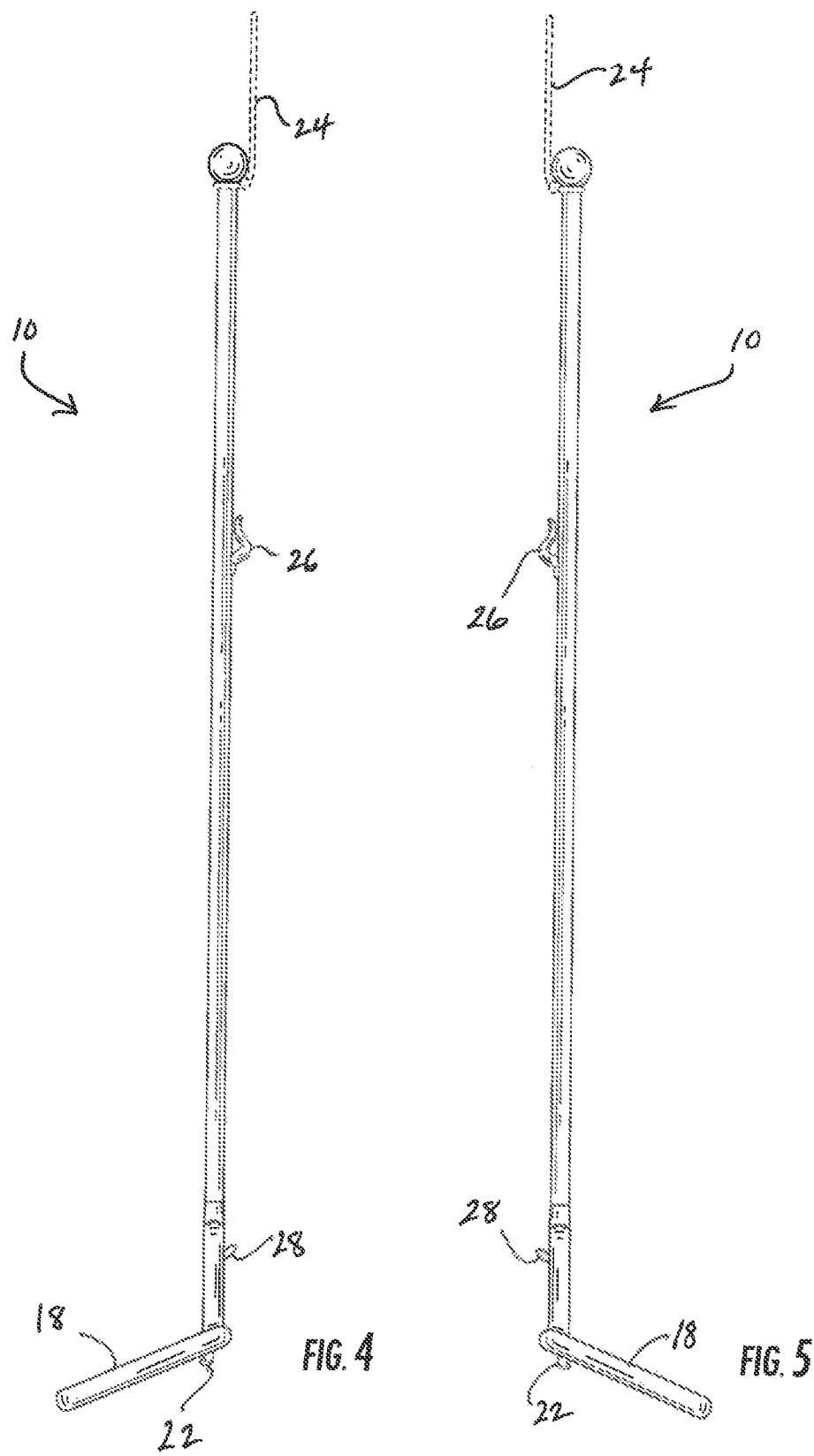

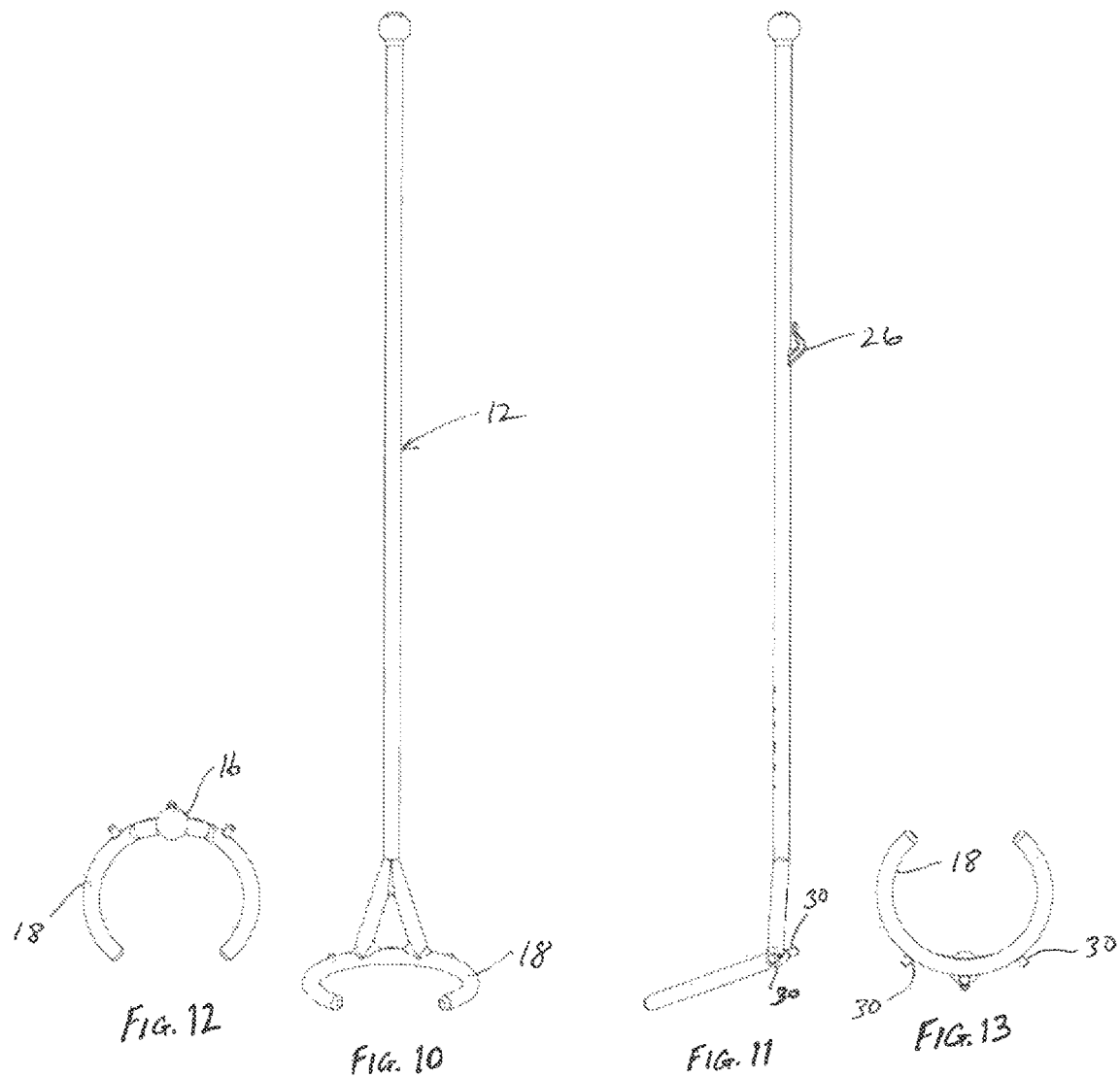

ANIMAL WASTE COLLECTING TOOL

CROSS-REFERENCE TO RELATED APPLICATION

This Application claims priority to and incorporates entirely by reference U.S. Provisional Application No. 62/381,166, filed on Aug. 30, 2016.

FIELD OF THE INVENTION

This invention relates to an animal waste collecting tool and, more particularly, a sanitary handler for collecting animal waste by a user who handles in a standing position.

BACKGROUND OF THE INVENTION

The act of collecting and disposing of animal waste, namely, domesticated animal feces, can become an annoyance over time, primarily for reasons concerning sanitation. There can exist particular difficulty in collecting animal waste for elderly and/or disabled individuals. Moreover, in urban locations lacking natural areas for domesticated animals to relieve themselves and instead featuring sidewalks, streets and walkways, additional nuisance issues can arise.

While there are existing devices for improved collection of animal waste, such as the device disclosed in U.S. Pat. No. 8,684,429, these devices fail to provide an adequate solution to each of the above-referenced problems.

In light of the problems discussed above, there exists a need for an animal waste collecting tool for improved sanitization that is adapted for easy receipt and removal of disposable bags.

BRIEF SUMMARY OF THE INVENTION

In accordance with one form of this invention there is provided an animal waste collecting tool for improved sanitization, the tool including an elongated shaft having an upper end and a lower end, wherein a clasp, for maintaining one or more disposable bags, is located on the backside of the elongated shaft; the upper end including an attachment member; a semi-circular member forming an opening sized for passage of a disposable bag; the lower end connecting to a V-shaped support member wherein two legs of the V-shaped support member are connected to the semi-circular member, the V-shaped support member and the semi-circular member having a plurality of hooks formed thereon; wherein one of the plurality of hooks is biased in the rearward direction and located on the V-shaped support member; wherein two of the plurality of hooks are biased in the forward direction and located on the bottom surface of the semi-circular member; and wherein the rearward facing hook and the plurality of forward facing hooks are for use securing the disposable bag on the semi-circular member.

In accordance with another form of this invention there is provided an animal waste collecting tool for improved sanitization, the tool including a disposable bag having forming at least one opening; an elongated shaft having an upper end and a lower end, wherein a clasp, for maintaining one or more disposable bags, is located on the backside of the elongated shaft; the upper end including an attachment member; a semi-circular member forming an opening sized for passage of a disposable bag; the lower end connecting to a V-shaped support member wherein two legs of the V-shaped support member are connected to the semi-circular member, the semi-circular member having a plurality of protrusions formed thereon; wherein each of the plurality of protrusions is biased in the rearward direction; and wherein the plurality of protrusions are sized for engaged receipt of a respective one of the at least one openings of the disposable bag for securing the disposable bag on the semi-circular member.

BRIEF DESCRIPTION OF THE DRAWINGS

For a fuller understanding of the nature of the present invention, reference should be made to the following detailed description, taken in conjunction with the accompanying drawings in which:

FIG. 2 is a front elevational view of the animal waste collecting tool of the present invention according to the embodiment illustrated in FIG. 1;

FIG. 3 is a rear elevational view of the animal waste collecting tool of the present invention according to the embodiment illustrated in FIG. 1;

FIG. 4 is a left side elevational view of the animal waste collecting tool of the present invention according to the embodiment illustrated in FIG. 1;

FIG. 5 is a right side elevational view of the animal waste collecting tool of the present invention according to the embodiment illustrated in FIG. 1;

FIG. 10 is a front elevational view of the animal waste collecting tool according to the embodiment illustrated in FIG. 9;

FIG. 11 is a side elevational view of the animal waste collecting tool according to the embodiment illustrated in FIG. 9;

FIG. 12 is a top plan view of the animal waste collecting tool according to the embodiment illustrated in FIG. 9;

FIG. 13 is a bottom plan view of the animal waste collecting tool according to the embodiment illustrated in FIG. 9;

Like reference numerals refer to like parts throughout the several views of the drawings.

DETAILED DESCRIPTION OF THE PREFERRED EMBODIMENTS

Figure 1:
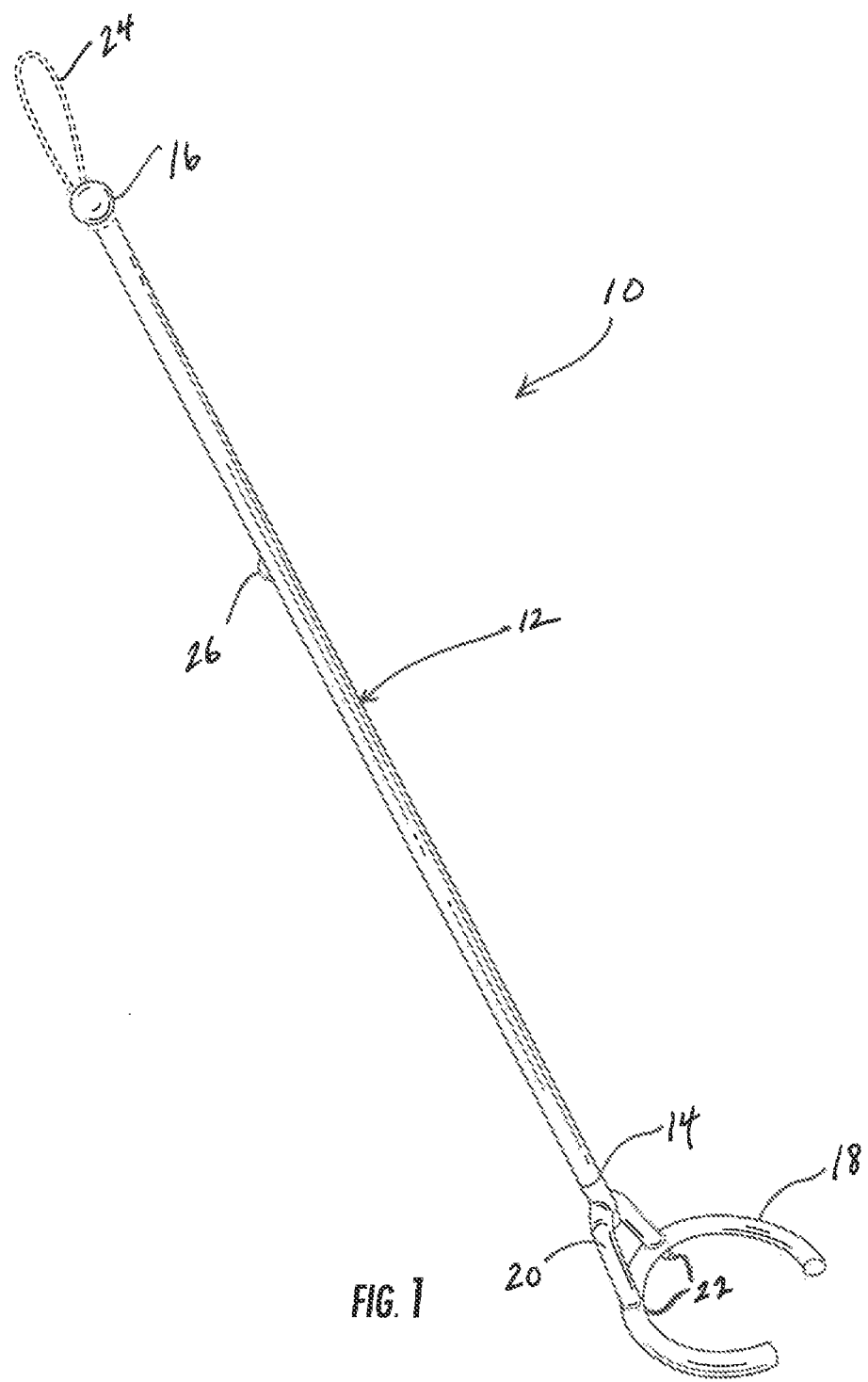
FIG. 1 is a perspective view of the animal waste collecting tool of the present invention according to a first embodiment.
Figure 6:
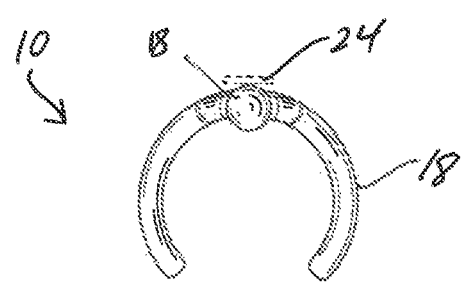
FIG. 6 is a top plan view of the animal waste collecting tool of the present invention according to the embodiment illustrated in FIG. 1.
Figure 7:
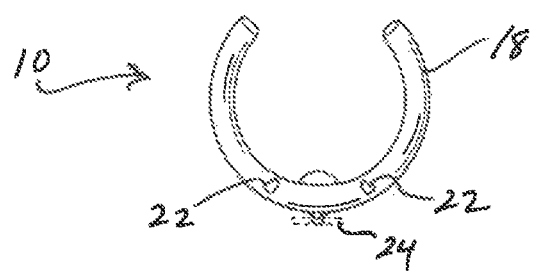
FIG. 7 is a bottom plan view of the animal waste collecting tool of the present invention according to the embodiment illustrated in FIG. 1.
Figure 8:
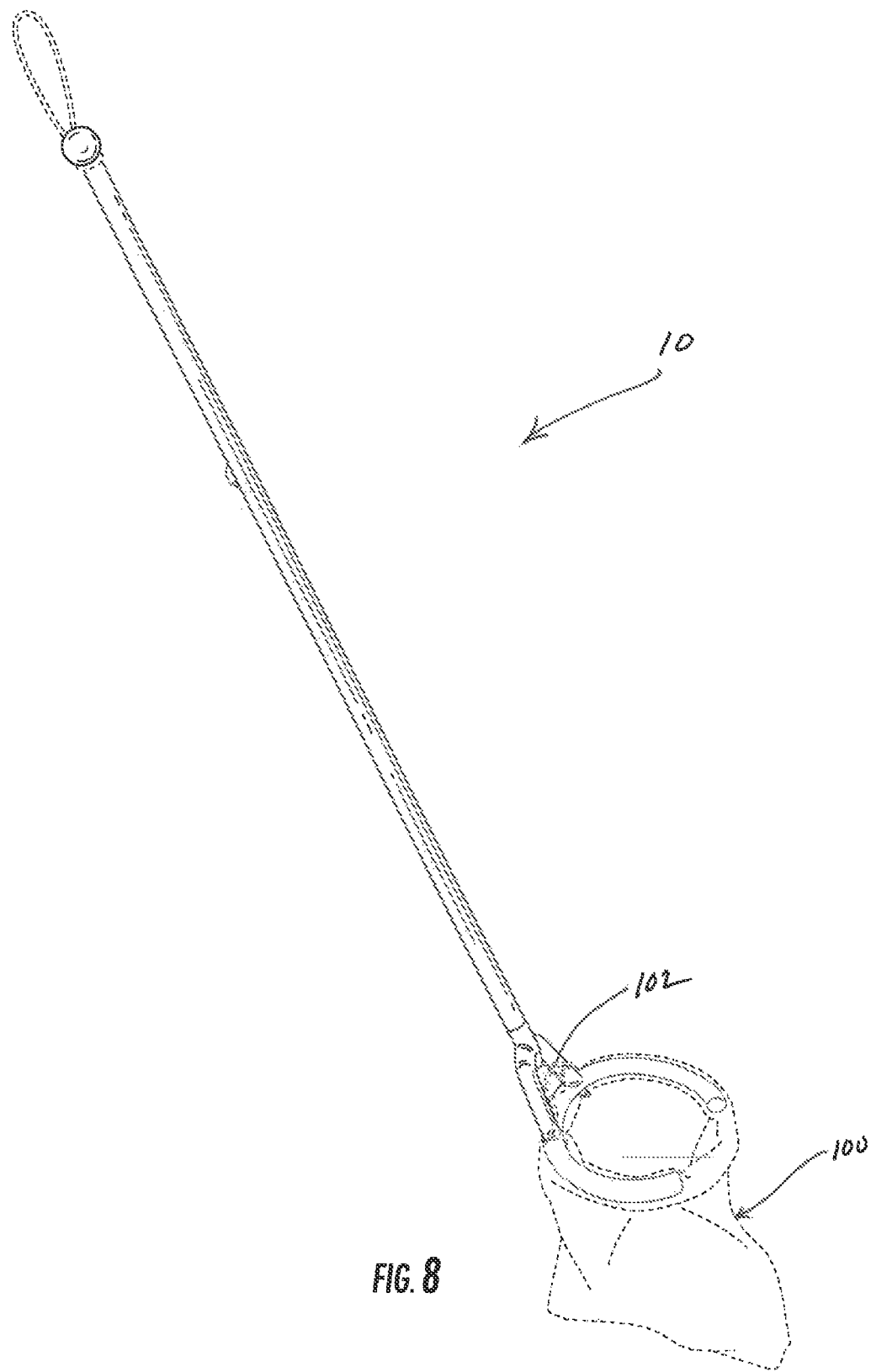
FIG. 8 is a front elevational view of the animal waste collecting tool of the present invention according to the embodiment illustrated in FIG. 1, including a disposable bag having drawstrings secured thereto.

Referring to the several views of the drawings, the animal waste collecting tool of the present invention for use in conjunction with disposable bags 100 having drawstrings 102 is shown in FIG. 8 and described herein and is generally indicated as 10.

Referring initially to FIGS. 1-8, the animal waste collecting tool 10 includes an elongated shaft 12 having a lower end 14 and an upper end 16. The lower end 14 is connected to a V-shaped support member 20. The V-shaped support member 20 is connected to a semi-circular member 18 through the tips of the two legs of the V-shaped support member 20. In some embodiments, the V-shaped support member 20, along with the semi-circular member 18, is detachable from the elongated shaft 12 by screwing off. In other embodiments, the V-shaped support member 20 and the semi-circular member 18 have a crossing angle between 90° and 135°. In further embodiments, the two tips of the semi-circular member 18 extend along the circular line to form a three-quarterly circle.

The semi-circular member 18 includes a plurality of hooks 22 on its bottom surface. In one embodiment, as shown throughout FIGS. 1-8, the plurality of hooks 22 are a pair of hooks 22. Referring specifically to FIGS. 4 and 5, each of the plurality of hooks 22 is biased in the forward direction. There is another hook 28 located inside the tip between two legs of the V-shaped support member 20. The hook 28 is biased in the rearward direction for use in conjunction with the plurality of hooks 22 for securing, the drawstring 102 of the disposable bag 100, as shown in FIG. 8. On the backside of the elongated shaft 12, there is a clasp 26 for maintaining one or more disposable bags 100 prior to use. In some embodiments, the upper end 16 includes an attachment member 24 for securing the animal waste collecting tool 10 to the user's arm. In other embodiments, the attachment member 24 is a wristband 24 which may be selectively slid on and off the user's wrist.

Further, the elongated shaft 12 of the animal waste collecting tool 10 may be retractable for easy storage. In some embodiments, the elongated shaft 12 is telescopic, adjustable for users with different heights. In other embodiments, the elongated shaft 12 includes one or more hinged connections such that it may be folded over onto itself. In further embodiments, the semi-circular member 18 may be hingedly connected to the elongated shaft 12 such that it may be retracted upwards in alignment with the elongate shaft 12 for storage during non-use.

Referring to FIG. 8, the animal waste collecting tool 10 is shown in operational position, wherein the disposable bag 100 has been passed through the opening of the semi-circular member 18 and centered such that the open-ended portion of the disposable bag 100 may be folded over itself and wrapped around the semi-circular member 18. Thereafter, and with proper positioning of the disposable bag 100, the drawstring 102 passes through and is secured about the forward-facing hooks 22 and the rearward facing hook 28.

Still referring to FIG. 8, when in the operational position, a user may selectively position the semi-circular member 18 beneath the animal as the animal begins to eliminate waste, thereby permitting capture and containment of the feces within the disposable bag 100. The disposable bag 100 may thereafter be removed from the animal waste collecting tool 10 by disengaging the drawstring 102 from the forward-facing hooks 22 and the rearward facing hook 28.

Figure 9:
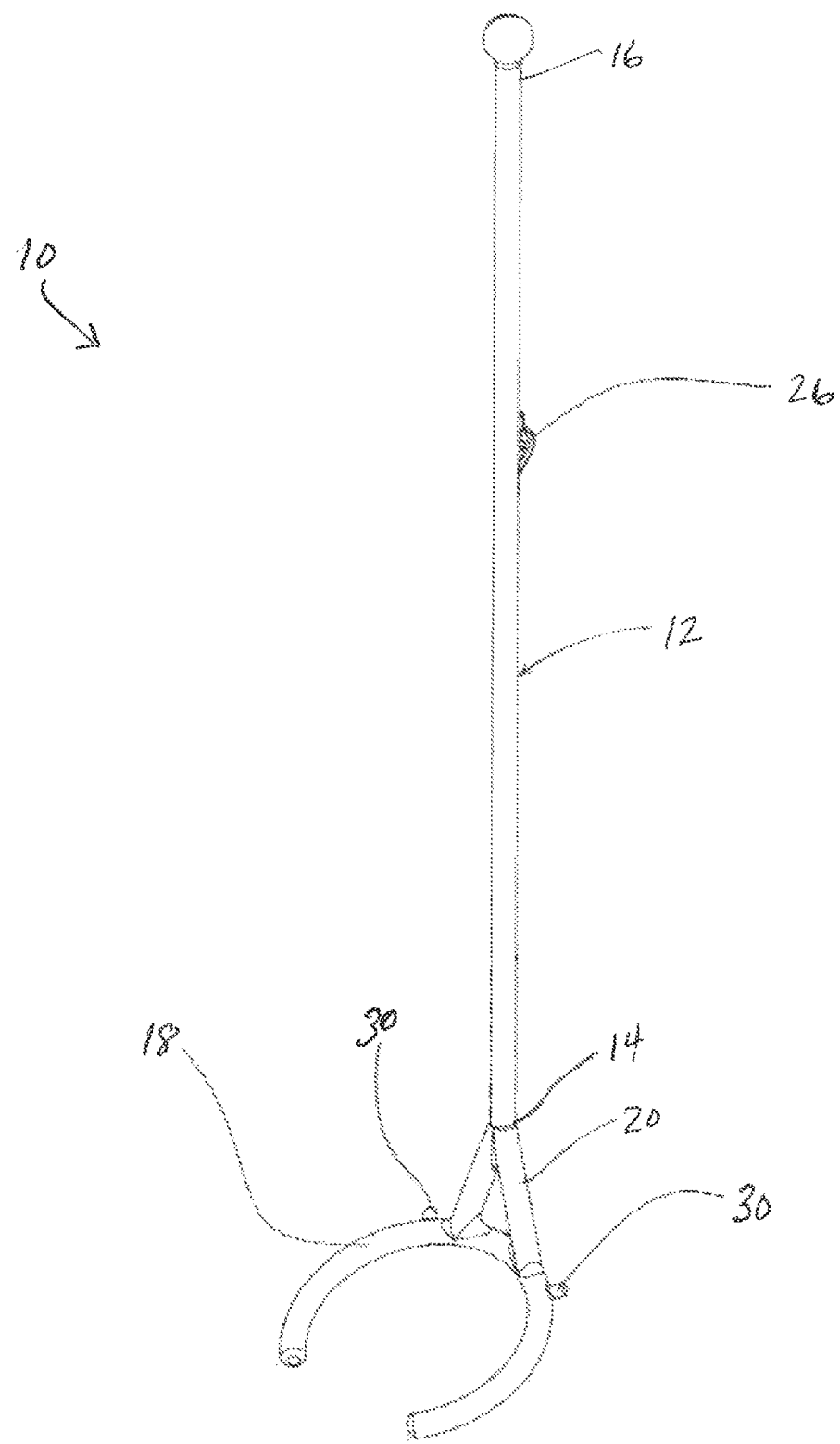
FIG. 9 is a perspective view of the animal waste collecting tool of the present invention according to another embodiment.

Now referring to FIGS. 9-15, another embodiment of the animal waste collecting tool 10 is provided. Referring specifically to FIG. 9, the tool 10 includes an elongated shaft 12 having a lower end 14 and an upper end 16. The lower end 14 is connected to a V-shaped support member 20. The V-shaped support member 20 is connected to a semi-circular member 18 through the tips of the two legs of the V-shaped support member 20. In some embodiments, the V-shaped support member 20, along with the semi-circular member 18, is detachable from the elongated shaft 12 by screwing off. In other embodiments, the V-shaped support member 20 and the semi-circular member 18 have a crossing angle between 90° and 135°. In further embodiments, the two tips of the semi-circular member 18 extend along the circular line to form a three-quarterly circle.

Referring specifically to FIGS. 9-13, the semi-circular member 18 includes a plurality of protrusions 30, such as hooks, formed thereon. In one embodiment, there are two protrusions 30 on opposing sides of the semi-circular member 18. Each of the plurality of hooks is biased in the rearward direction; and wherein the plurality of protrusions is sized for engaged receipt of a respective one of the at least one openings of the disposable bag for securing the disposable bag on the semi-circular member.

Figure 15:
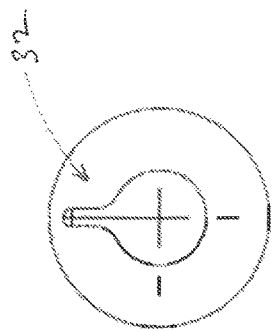
FIG. 15 is an isolated view of an aperture taken from FIG. 14.
Figure 14:
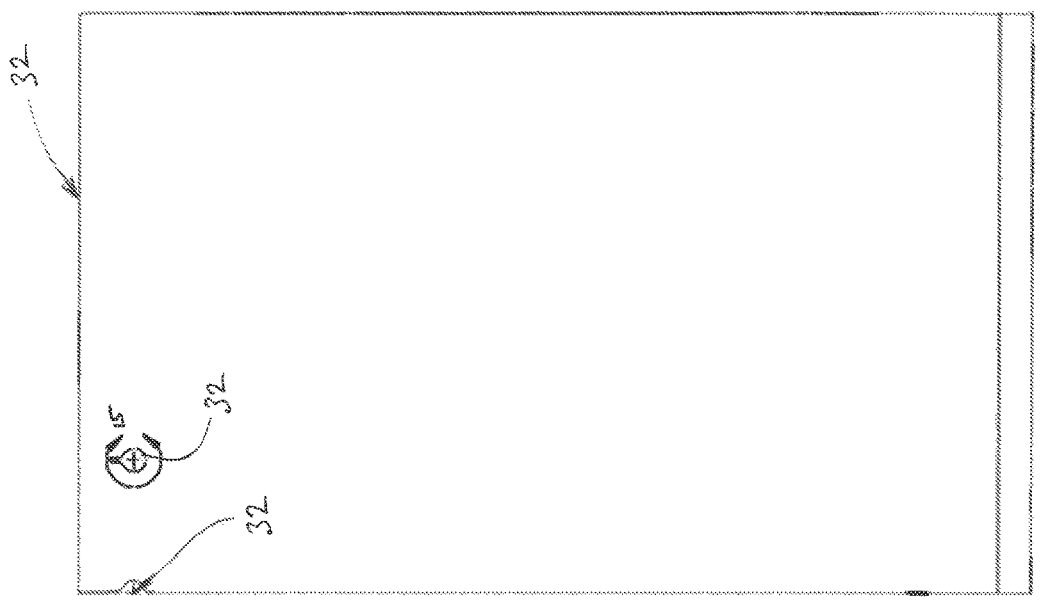
FIG. 14 is a side elevational view of a waste bag for use in conjunction with the animal waste collecting tool according to the embodiment illustrated in FIG. 9.

Referring specifically to FIGS. 14 and 15, the disposable bag 30 forms openings 32, each of which are sized for receipt of a respective one of the protrusions 30.

While the present invention has been shown and described in accordance with several preferred and practical embodiments, it is recognized that departures from the instant disclosure are contemplated within the spirit and scope of the present invention.

What is claimed is:

1. An animal waste collecting tool comprising:
an elongated shaft having a frontside, a backside, an upper end and a lower end, wherein a clasp, for maintaining one or more disposable bags, is located on the backside of said elongated shaft;
said upper end including an attachment member;
a semi-circular member forming an opening sized for passage of a disposable bag, the semi-circular member including a bottom surface;
said lower end connecting to a V-shaped support member wherein two legs of the V-shaped support member are connected to the semi-circular member, said V-shaped support member and said semi-circular member having a plurality of hooks formed thereon;
wherein one of said plurality of hooks is oriented in a rearward facing direction and located on the V-shaped support member;
wherein two of said plurality of hooks are oriented in a forward facing direction and located on the bottom surface of the semi-circular member; and
wherein the plurality of hooks is structured and disposed for securing the disposable bag on the semi-circular member.

2. The animal waste collecting tool as recited in claim 1, wherein the attachment member on said upper end is a wristband that may be selectively slid on and off the user's wrist.

3. The animal waste collecting tool as recited in claim 1, wherein the V-shaped member connecting with the semi-circular member is detachable from said elongated shaft for replacement.

4. The animal waste collecting tool as recited in claim 1, wherein the V-shaped member and the semi-circular member have a crossing angle between 90° and 135°.

5. An animal waste collecting tool comprising:
a disposable bag forming at least one opening;
an elongated shaft having a frontside, a backside, an upper end and a lower end, wherein a clasp, for maintaining one or more disposable bags, is located on the backside of said elongated shaft;

said upper end including an attachment member;

a semi-circular member forming an opening sized for passage of a disposable bag;

said lower end connecting to a V-shaped support member wherein two legs of the V-shaped support member are connected to the semi-circular member, said semi-circular member having a plurality of protrusions formed thereon;

wherein each of said plurality of protrusions is oriented in a rearward direction; and wherein said plurality of protrusions are sized for engaged receipt of a respective one of said at least one openings of said disposable bag for securing the disposable bag on the semi-circular member.

6. The animal waste collecting tool as recited in claim 5, wherein the attachment member on said upper end is a wristband that may be selectively slid on and off the user's wrist.

7. The animal waste collecting tool as recited in claim 5, wherein the V-shaped member connecting with the semi-circular member is detachable from said elongated shaft for replacement.

8. The animal waste collecting tool as recited in claim 5, wherein the V-shaped member and the semi-circular member have a crossing angle between 90° and 135°.

* * * * *